G. W. BROWN.
Corn-Planter.
No. 526. Reissued Feb. 16, 1858.
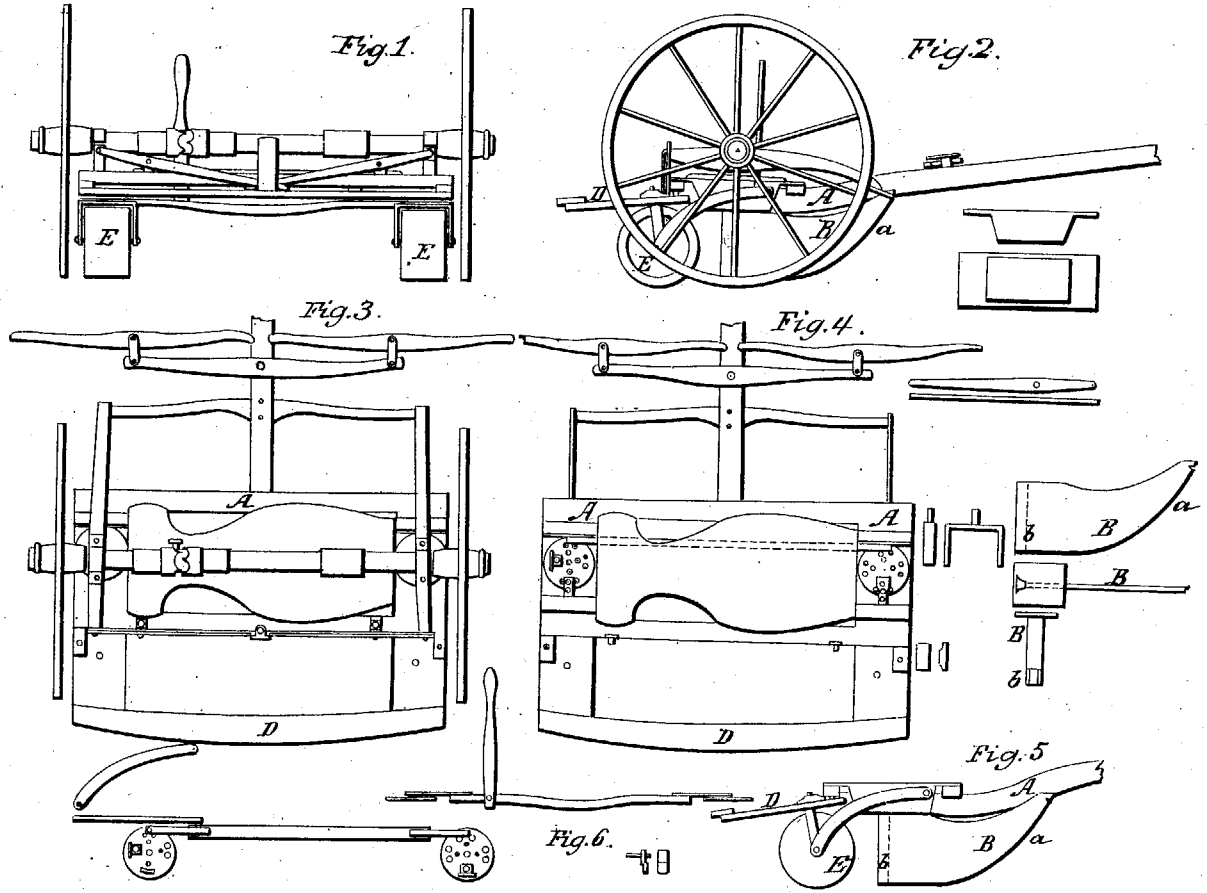
N. PETERS, PHOTO-LITHOGRAPHER, WASHINGTON, D. C.

UNITED STATES PATENT OFFICE.

GEORGE W. BROWN, OF GALESBURG, ILLINOIS.

IMPROVEMENT IN SEED-PLANTERS.

Specification forming part of Letters Patent No. 9,893, dated February 2, 1853; Reissue No. 526, dated February 16, 1858.

*To all whom it may concern:*

Be it known that I, GEORGE W. BROWN, formerly of Tylerville, in the county of Warren and State of Illinois, but now of Galesburg, in the county of Knox and State aforesaid, have invented certain new and useful Improvements in Seed-Planters; and I do hereby declare the following to be a full, clear, and exact description of the same, reference being had to the accompanying drawings, making a part of this specification, in which—

Figure 1 represents an elevation of the rear part of the machine. Fig. 2 represents a side view. Fig. 3 represents a top plan when fitted for drilling in the seed, and Fig. 4 represents a similar top plan when fitted for planting in check-rows. Fig. 5 represents a side view of the machine when fitted for planting check-rows. Fig. 6 represents the cap and pin used in effecting a change in the machine.

Similar letters of reference, where they occur in the several figures, denote like parts of the machine in all.

The nature of my invention relates to the construction of the shoe for opening and holding open the furrow until the seed drops through its tube, which is made in the rear end of said shoe.

To enable others skilled in the art to make and use my invention, I will proceed to describe the same with reference to the drawings.

The machine as represented in Figs. 1, 2, 3 is arranged for drilling in the seed; but the most important feature connected with the machine is its adaptability to planting seed in check-rows, and I shall describe it more particularly in connection with this latter kind of planting. On the front part of the frame A are two shoes, B B, which are shaped somewhat like a sled-runner, but having their convex edge *a* sharp enough to cut through the soil or sod, and thus open out a furrow. The shoe B gradually widens out toward its rear end until at that point it is wide enough to admit of an opening, *b*, through which the corn or other seed from the hopper may pass into the furrow. It is an easy matter to open a furrow for seed, but to keep it open and keep the seed-duct from choking up with the earth is not so easy. I therefore make the shoe and seed-tube in one piece, and while the front of the shoe is cutting and opening the furrow the rear portion is holding the furrow open until the seeds are deposited in it. As a furrow-opener this shoe is perfect; but in turning the machine at the end of the rows it will be at once seen that some means must be devised for raising these shoes, which support and sustain the main frame, hopper, &c. This, in connection with the shoe, constitutes another important feature in the invention.

A represents the main frame, supported by the shoes B, and D represents a secondary frame pivoted to the main frame at *c*, Figs. 2, 5, said secondary frame D carrying two bearing and covering rollers, E E, which, when the said frame D is used as a lever by the operator walking behind the machine to raise up the runners or shoes out of the ground, become the fulcra of said lever, and *c* the pivoting-point, and thus the main frame and shoes are raised up clear of the ground, or sufficiently so to allow the machine to turn around without wrenching or breaking it. In planting corn the wheels and axle are dispensed with entirely, and without these the machine is exceedingly cheap, when its efficiency is taken into consideration.

I am aware that a rotary colter has been used in advance of a seed-tube to open the furrow, but it will not hold it open until the seed are deposited. I am also aware that a sort of concave colter with a seeding-tube in rear of it has been used; but this will not cut through the sods and open a furrow properly, its tendency being to pile and raise up everything upon the colter, and thus clog the machine. My shoe disturbs nothing. It cuts through and gently pushes aside the soil, &c., and has inclosed within its rear portion a tube into which no earth can get, and through which seeds pass to the very bottom of the furrow with nothing to disturb them, and where they are covered up.

I describe only those parts of the machine which I claim, the other parts being of any ordinary well-known arrangement, and they are all shown collectively, and many of them separately, in the drawings. The particular construction of the shoe and its combination with the jointed frames being the essential things.

Having thus fully described the nature and object of my invention, I would state that I am aware a rotary colter has been used in opening a furrow for seed to be dropped into from a seeding-machine; but as the tube is necessarily placed behind such a colter, the earth will run into and fill up the furrow between the colter and the tube before the seed are dropped into it. I do not therefore claim any such contrivance; but What I do claim as new, and desire to secure by Letters Patent, is—

A shoe for opening a furrow, which has a convex edge in front and a seeding-tube in its rear end, so that it may cut through any grass, open out a furrow and hold it open until the seeds are deposited in it, substantially as herein set forth.

GEORGE W. BROWN.

Witnesses:
A. B. STOUGHTON,
THOS. H. UPPERMAN.